United States Patent [19]
Cowan et al.

[11] 4,345,039
[45] Aug. 17, 1982

[54] METHOD OF RECOVERING POLYESTER FIBERS AND CELLULOSIC POWDER FROM POLYESTER/COTTON TEXTILE WASTE

[75] Inventors: Jack C. Cowan, Lafayette, La.; Tommy Thrash, Littlefield, Tex.

[73] Assignee: Venture Chemicals, Inc., Lafayette, La.

[21] Appl. No.: 269,492

[22] Filed: Jun. 1, 1981

[51] Int. Cl.³ .......................... C08J 11/00; C08J 11/04
[52] U.S. Cl. .......................................... 521/48; 521/40
[58] Field of Search ..................... 260/2.3; 521/48, 40, 521/45.5

[56] References Cited

U.S. PATENT DOCUMENTS 3,937,671 2/1976 Gruntfest et al. .................... 260/2.3
3,937,675 2/1976 Gruntfest et al. .................... 260/2.3

*Primary Examiner*—Allan Lieberman
*Attorney, Agent, or Firm*—Roy F. House

[57] ABSTRACT

A method of recovering useful polyester fibers and cellulosic material from textile wastes containing blended polyester/cellulosic fibers wherein the textile waste is treated with anhydrous hydrochloric acid gas under reaction conditions sufficient to degrade the cellulosic material, the treated waste is mechanically degraded to convert the reacted cellulosic material to a fine powder, and thereafter the cellulosic material is separated from the polyester fibers.

10 Claims, No Drawings

METHOD OF RECOVERING POLYESTER FIBERS AND CELLULOSIC POWDER FROM POLYESTER/COTTON TEXTILE WASTE

Millions of pounds of waste textiles consisting of various blends of polyester fibers and cellulosic fibers, such as cotton, rayon and the like, are produced annually in the manufacture of cloth, clothing, and other textile products. Such textiles are most often treated with resinous and other materials of various types to impart special properties to the fabric, such as crease resistance, flame retardency, and the like. The direct use of such wastes cannot be accomplished.

Waste polyester scrap can be used to recover the polyester raw materials, in staple grade fiber production, and in garneting fiber for textile processing.

There has been disclosed in Gruntfest et al. U.S. Pat. Nos. 3,937,671 and 3,937,675, two methods of separating the cellulose from the polyester in polyester/cellulosic blends. The method proposed in U.S. Pat. No. 3,937,671 is to treat such wastes with an aqueous solution of glacial acetic acid and acetic anhydride to form cellulose acetate, and separating the water solution containing the cellulose acetate from the polyester. If additives are present on the waste, the waste material is first treated with a dilute acid to remove the additives. The method proposed in U.S. Pat. No. 3,937,675 is to treat the polyester/cellulosic waste with an aqueous solution of a mineral acid at a temperature in the range from about 80° C. to 100° C. to convert the cellulosic fiber to a substantially non-fibrous condition, separating the polyester fibers from the liquid and cellulosic reaction product, and thereafter separating the cellulosic reaction product from the liquid. As in U.S. Pat. No. 3,937,675, if additives are present on the waste, the waste material is first treated with a dilute acid to remove the additives.

These methods are very expensive and have not met with commercial success. Large quantities of reactants per weight of waste material are needed in the process of U.S. Pat. No. 3,937,671 and the recovered materials must be dried. High reaction temperatures and excessive quantities of acid are necessary in the process of U.S. Pat. No. 3,937,675, and again, the recovered materials must be dried.

Accordingly, there is a need for an economical process for recovering polyester fibers and cellulosic material in useful forms from polyester/cellulosic textile wastes.

It is an object of this invention to provide an economical method of separating the polyester fibers from the cellulosic material in textile wastes containing blended polyester and cellulosic fibers.

It is another object of this invention to recover polyester fibers and cellulosic materials in useful forms from such textile wastes.

It is still another object of this invention to provide a process of recovering polyester fibers and cellulosic material from waste resin treated, blended polyester and cellulose fibers which does not include a preliminary aqueous acid treatment.

These and other objects of this invention will be apparent to one skilled in the art as the description thereof proceeds.

According to this invention, textile wastes containing blended fibers of polyester and cellulosic material, preferably cotton, are treated with anhydrous hydrochloric acid gas (hereinafter sometimes referred to as AHAG) under reaction conditions sufficient to degrade the cellulosic material while leaving the polyester fibers substantially unaffected, mechanically degrading the reacted cellulosic material to a dry powder, and separating the polyester fibers from the reacted cellulosic material.

It has been found that an amount of AHAG from about 0.3% to about 3% by weight of the cellulosic material in the waste when reacted at a temperature from ambient to about 180° F. for a period from about 5 minutes to about 48 hours is sufficient to convert the cellulosic material to a fine powder after subjecting the reacted cellulosic material to mechanical degradation. Preferably there is used an amount of AHAG from about 1% to about 3% by weight based on the weight of the cellulosic material in the waste at a temperature in the range from about 100° F. to about 180° F. for a period from about 5 minutes to about one hour. More AHAG can be used but is unnecessary.

After reacting the AHAG and the cellulosic material in the waste, the reacted cellulosic material is mechanically degraded as by buffering, augering, abrading, milling, tumbling, vibrating, and the like. Preferably, the treatment of the waste with the AHAG and the mechanical degradation of the reacted cellulosic material are conducted simultaneously in a suitable apparatus.

Thereafter, the polyester fibers can be separated from the fine cellulosic powder by contacting the reacted waste with compressed gas, preferably air, and recovering the cellulosic powder in an appropriate receptacle such as a bag house.

Alternatively, the polyester fibers can be separated from the fine cellulosic powder by washing the fibers, recovering the cellulosic powder from the wash system by filtration utilizing a fine filter after separating the polyester fiber from the wash system by a coarse filtration.

The polyester fibers after drying are suitable for use in producing staple grade polyester fiber, in garneting processes for producing spun yarn or non-woven fabrics, and as a raw material to recover the components of the polyester.

The fine cellulosic powder after drying is useful as a lost circulation material and as a seepage control additive in oil well drilling fluids, and as a filler in various industrial compositions such as mastic compounds, automobile undercoatings, and the like.

Where necessary, various methods are available for analyzing cotton/polyester blends in order to determine the percentage of cellulosic material in the blend. See for example the following articles incorporated herein by reference: (1) "Sodium Hydroxide. Complementary Reagent for Analyzing Cotton-Polyester Blends," King, Walter D. and Stanonis, David J., Textile Chem. Color. 1975, 7(2), 34–35; and (2) "Analysis Methods for Cotton/Polyester Blends," King, Walter D. and Stanonis, David J., American Dyestuffs Reporter 1976, 65(6), 36, 37, 39, 60.

U.S. Pat. No. 3,960,485 discloses a process for reclaiming the components of the polyester by depolymerization of the polyester fibers.

The reacted cellulose powder is hydrophilic since it is readily wet with water. It is advantageously used to lower the fluid loss of aqueous base drilling fluids containing various polymeric filtration control additives, such as carboxymethyl cellulose, pre-gelatinized starch, polyacrylonitrile, and the like.

The following non-limiting examples are given to further illustrate the invention.

EXAMPLE 1

Non-resin treated white sheets made of a 50/50 blend of polyester fibers and cotton fibers were cut into pieces from about 1 inch to about 2 inches on a side. The pieces were added to a vessel designed to be heated and tumbled. The blended fibers were treated with anhydrous hydrochloric acid gas in an amount of 1.5% by weight of the cotton in the blended fibers for about 15 minutes at a temperature in the range from about 130° F. to about 160° F. Thereafter the treated pieces were subjected to compressed air by removing the cover from a screened opening in the vessel, connecting a fine cloth bag to the screened opening, and admitting compressed air through orifices in the vessel.

In this manner the cotton was degraded to a fine powder which collected in the cloth bag and the polyester fibers remained in the vessel, from which they were recovered.

EXAMPLE 2

Waste resin treated permanent press cloth containing various percentage blends of polyester and cotton, from 50%/50% to 80%/20%, of various sizes ranging up to about 12 inches in length were placed in the vessel of Example 1 and treated with 1% anhydrous hydrochloric acid gas for 10 minutes at a temperature in the range from 120° F. to 160° F.

The treated waste was then agitated in water for 10 minutes during which time the reacted cotton was removed from the polyester fibers and suspended in the wash water. The wash water and suspended reacted cotton was removed by filtration through a 100 mesh screen. The reacted cotton was removed from the wash water by filtration through a fine filter cloth.

The polyester fibers and reacted cotton were air dried to recover materials in useful form.

We claim:

1. A method for recovering polyester fibers and cellulosic material in useful form from textile wastes containing blended polyester/cellulosic fibers comprising treating the textile waste with from about 0.3% to about 3% by weight of the cellulosic material in the waste of anhydrous hydrochloric acid gas at a temperature in the range from about ambient to about 180° F. for a period from about 5 minutes to about 48 hours, mechanically degrading the reacted cellulosic material to a fine powder, and separating the polyester fibers from the reacted cellulosic material, wherein said cellulosic material is selected from the group consisting of cotton and rayon.

2. The method of claim 1 wherein said textile waste is treated with anhydrous hydrochloric acid gas in an amount from about 1% to about 3% by weight of the cellulosic material in the waste at a temperature in the range from about 100° F. to about 180° F. for a period from about 5 minutes to about one hour.

3. The method of claims 1 or 2 wherein said cellulosic material is cotton.

4. The method of claims 1 or 2 wherein said treating and said mechanically degrading steps are conducted simultaneously.

5. The method of claims 1 or 2 wherein said separating step is conducted utilizing a compressed gas, wherein said treating and said mechanically degrading steps are conducted simultaneously, and wherein said cellulosic material is cotton.

6. A method of separating the polyester from the cellulosic material in textile wastes containing resin treated, blended polyester and cellulosic fibers which comprises treating the textile waste with from about 0.3% to about 3% by weight of the cellulosic material in the waste of anhydrous hydrochloric acid gas at a temperature in the range from about ambient to about 180° F. for a period from about 5 minutes to about 48 hours, mechanically degrading the reacted cellulosic material to a fine powder, and separating the polyester fibers from the reacted cellulosic material, wherein said cellulosic material is selected from the group consisting of cotton and rayon.

7. The method of claim 6 wherein said textile waste is treated with anhydrous hydrochloric acid gas in an amount from about 1% to about 3% by weight of the cellulosic material in the waste at a temperature in the range from about 100° F. to about 180° F. for a period from about 5 minutes to about one hour.

8. The method of claims 6 or 7 wherein said cellulosic material is cotton.

9. The method of claims 6 or 7 wherein said treating and said mechanically degrading steps are conducted simultaneously.

10. The method of claims 6 or 7 wherein said separating step is conducted utilizing a compressed gas, wherein said treating step and said mechanically degrading step are conducted simultaneously, and wherein said cellulosic material is cotton.

* * * * *